United States Patent
Baumer et al.

(10) Patent No.: US 11,990,648 B2
(45) Date of Patent: May 21, 2024

(54) ELECTROCHEMICAL CELL ACTIVATED WITH A LIQUID ELECTROLYTE WETTING THE ELECTRODE ASSEMBLY THROUGH A CHANNEL SYSTEM IN THE CASING LID

(71) Applicant: Greatbatch Ltd., Clarence, NY (US)

(72) Inventors: Daniel M. Baumer, Middleport, NY (US); Joshua C. Ulrich, East Aurora, NY (US); Marcus J. Palazzo, Wheatfield, NY (US); David Wutz, Williamsville, NY (US); David Dianetti, Lancaster, NY (US)

(73) Assignee: Greatbatch Ltd., Clarence, NY (US)

( * ) Notice: Subject to any disclaimer, the term of this patent is extended or adjusted under 35 U.S.C. 154(b) by 229 days.

(21) Appl. No.: 17/358,076

(22) Filed: Jun. 25, 2021

(65) Prior Publication Data

US 2022/0013876 A1    Jan. 13, 2022

Related U.S. Application Data

(60) Provisional application No. 63/050,311, filed on Jul. 10, 2020.

(51) Int. Cl.
*H01M 50/636* (2021.01)
*H01M 6/14* (2006.01)
*H01M 50/153* (2021.01)

(52) U.S. Cl.
CPC ........... *H01M 50/636* (2021.01); *H01M 6/14* (2013.01); *H01M 50/153* (2021.01)

(58) Field of Classification Search
CPC ..................................................... H01M 6/14
See application file for complete search history.

(56) References Cited

U.S. PATENT DOCUMENTS

| | | | |
|---|---|---|---|
| 5,415,959 | A | 5/1995 | Pyszczek et al. |
| 6,610,443 | B2 | 8/2003 | Paulot et al. |
| 7,128,765 | B2 | 10/2006 | Paulot et al. |
| 10,446,825 | B2 | 10/2019 | Voss et al. |

(Continued)

FOREIGN PATENT DOCUMENTS

CN          1992422 B     12/2011

OTHER PUBLICATIONS

"Extended European Search Report Application No. 21183271.2', dated Dec. 7, 2021".

*Primary Examiner* — Matthew T Martin
*Assistant Examiner* — Ankith R Sripathi
(74) *Attorney, Agent, or Firm* — Michael F. Scalise

(57) ABSTRACT

A miniature electrochemical cell of a primary or secondary chemistry with a total volume that is less than 0.5 cc is described. The cell has a casing comprising an annular sidewall supported on a lower plate opposite an upper lid. The lid has a sealed electrolyte fill port. At least one electrolyte channel in the inner surface of the lid extends radially from the fill port and outwardly beyond an outer peripheral edge of the current collector. A current collector contacts an inner surface of the lid with a first electrode active material contacting the current collector. An opposite polarity active material contacts the lower plate. A dielectric material coats the lower open end of the annular sidewall and a portion of the inner surface of the sidewall. A glass seals the dielectric material to the lower plate. An electrolyte activates the electrode assembly.

21 Claims, 3 Drawing Sheets

(56) References Cited

U.S. PATENT DOCUMENTS

| | | |
|---|---|---|
| 10,957,884 B1 | 3/2021 | Dianetti et al. |
| 2006/0037190 A1 | 2/2006 | Rubino et al. |
| 2011/0097623 A1 | 4/2011 | Marinis et al. |
| 2021/0143450 A1* | 5/2021 | Kato .................. H01M 8/0267 |

* cited by examiner

ELECTROCHEMICAL CELL ACTIVATED WITH A LIQUID ELECTROLYTE WETTING THE ELECTRODE ASSEMBLY THROUGH A CHANNEL SYSTEM IN THE CASING LID

CROSS-REFERENCE TO RELATED APPLICATION

This application claims priority to U.S. provisional application Ser. No. 63/050,311, filed on Jul. 10, 2020.

BACKGROUND OF THE INVENTION

1. Field of the Invention

The present invention relates to the conversion of chemical energy to electrical energy. More particularly, the present invention relates to an electrochemical cell having a total size or volume that is less than 0.5 cc. Such so-called miniaturized electrochemical cells enable numerous new and improved medical device therapies. Miniature electrochemical cells are defined as those having a size or total volume that is less than 0.5 cc.

2. Prior Art

The casing for a miniature electrochemical cell according to the present invention consists of three main components: a lower plate supporting a cylindrically-shaped annular sidewall having an open upper end closed with a cover plate or lid. The lower plate, annular sidewall and lid are each of a metal material, for example, titanium.

The annular sidewall is selectively coated with a dielectric material to provide electrical isolation of the to-be-housed first active material, for example, an anode active material, from the annular sidewall. A sealing glass is applied to the perimeter of the lower plate with the annular sidewall supported on the glass. The annular sidewall and lower plate are heated to a temperature that is sufficient to achieve a glass-to-metal seal between them. The thickness of the sealing glass combined with the glass seal bonds at the lower plate and at the annular sidewall are sufficient to ensure electrical isolation between the lower plate and the supported annular sidewall.

A layer of a first active material, for example, an anode active material, is deposited into the cavity formed by the lower plate/annular sidewall subassembly. In this position, the anode active material is in electrical contact with the exposed inner surface of the lower plate, which serves as the negative terminal for the cell, but which is electrically isolated from the annular sidewall by the above described sealing glass. A separator is supported on the anode active material.

Separately, a current collector, for example, a cathode current collector, is contacted to an inner surface of the lid. A layer of a second active material, for example, a cathode active material, is then contacted to the current collector opposite the lid. The metallic lid/current collector/second active material subassembly is then seated on an inner step of the annular sidewall, and the lid and sidewall are welded together. In this construction, the lid connected to the annular sidewall is in electrical continuity with the cathode active material through the cathode current collector to thereby serve as the positive terminal for the cell.

Finally, the electrode assembly is activated with an electrolyte filled into the casing through a fill port in the lid. The fill port is sealed with a closure member welded therein or by melting the material of the lid into a solid mass closing the fill port.

However, a vexing problem with this type of cell construction, particularly for a miniature electrochemical cell having a size or total volume that is less than 0.5 cc, is that there is very limited internal space in the casing for electrolyte. There simply isn't any extra internal space that can serve as an avenue for electrolyte to effectively wet the opposite polarity active materials to an extent that is sufficient to promote desirable cell discharge. In addition to a lack of extra internal space, the cathode current collector contacted to the cathode active material substantially blocks or covers the electrolyte fill port in the lid.

Thus, there is a need for an improved miniature electrochemical cell that is designed to readily permit electrolyte to flow into the casing to activate the electrode assembly during the filling operation.

SUMMARY OF THE INVENTION

To help ameliorate the electrolyte filling problem described above, the cover plate or lid has an electrolyte fill port and the lower surface of the lid has at least one, and more preferably, at least two or more, for example, four electrolyte channels extending radially outwardly from the fill port. The electrolyte channels, which do not extend to the peripheral edge of the lid, but which extend laterally outwardly beyond the outer peripheral edge of the current collector, are in fluid flow communication with the electrolyte fill port. The fill port/fluid channel system allows the casing to be filled with electrolyte using a vacuum filling process so that activating electrolyte readily wets the anode and cathode active materials and the intermediate separator. This is especially important in the miniature electrochemical cells of the present invention having a size or total volume that is less than 0.5 cc. In such small size cells, the desired volume of electrolyte is sufficient to activate the anode and cathode active materials without there being an overabundance of electrolyte. Without the fill port/electrolyte channel system of the present invention, it is sometimes difficult for electrolyte to sufficiently wet the opposite polarity electrode active materials to promote acceptable cell discharge.

While the present cell designs are adapted for miniature electrochemical cells, they are also applicable to cells that have a total volume that is greater than 0.5 cc and are not classified as "miniature". Moreover, the present electrochemical cells are not limited to any one chemistry; they can be an alkaline cell, a primary lithium cell, a rechargeable lithium cell, a Ni/cadmium cell, a Ni/metal hydride cell, a supercapacitor, a thin film solid-state cell, and the like. One preferred chemistry is a lithium-ion electrochemical cell comprising a carbon-based or $Li_4Ti_5O_{12}$-based anode and a lithium metal oxide-based cathode, such as of $LiCoO_2$ or lithium nickel manganese cobalt oxide ($LiNi_aMn_bCo_{1-a-b}O_2$). The lithium-ion electrochemical cell is activated with a liquid electrolyte.

These and other aspects of the present invention will become increasingly more apparent to those skilled in the art by reference to the following detailed description and to the appended drawings.

DETAILED DESCRIPTION OF THE PREFERRED EMBODIMENTS

Figure 1:
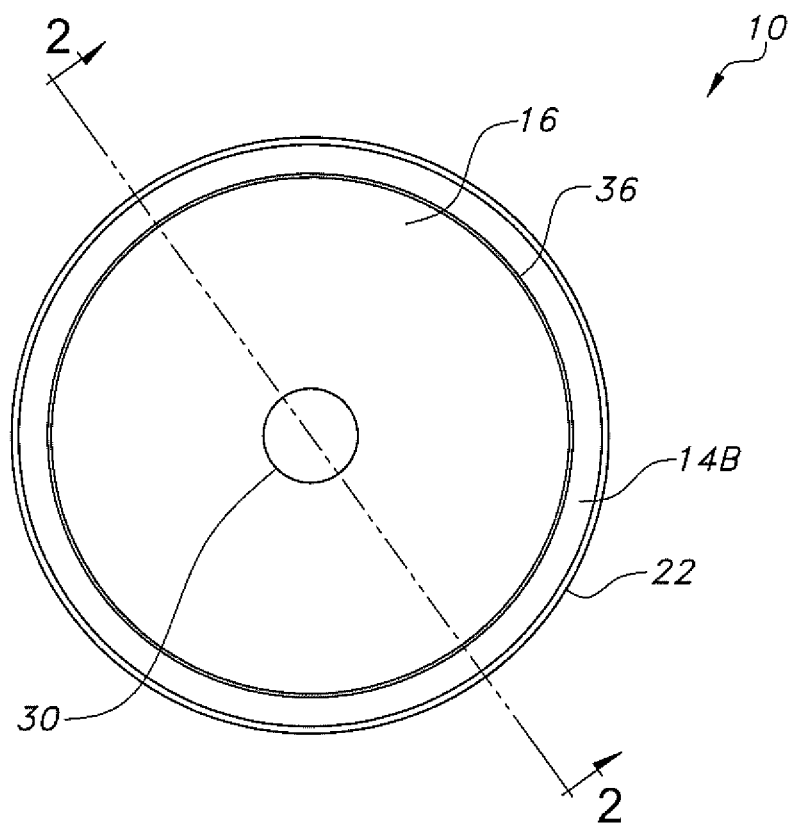
FIG. 1 is a plan view of an electrochemical cell 10 according to the present invention.
Figure 2:
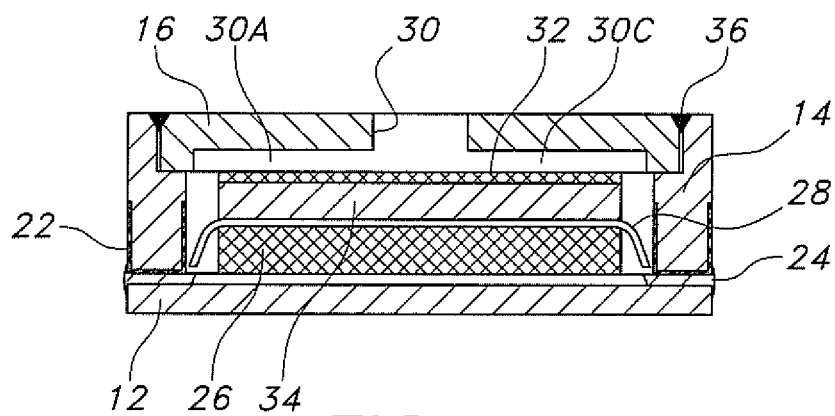
FIG. 2 is a cross-sectional view taken along line 2-2 of FIG. 1.

Turning now to the drawings, FIGS. 1 and 2 illustrate that an electrochemical cell 10 according to the present invention comprises an electrode assembly housed in a hermetically sealed casing. The casing comprises a lower plate 12 supporting an annular sidewall 14 having an open end closed by a plate-shaped cover or lid 16. The lower plate 12, annular sidewall 14 and lid 16 are each of a biocompatible metal, for example, titanium. In addition to titanium, suitable materials for the lower plate 12, annular sidewall 14 and lid 16 include stainless steel, mild steel, nickel-plated mild steel, but not limited thereto, so long as the metallic material is compatible for use with the other cell components.

Figure 2A:
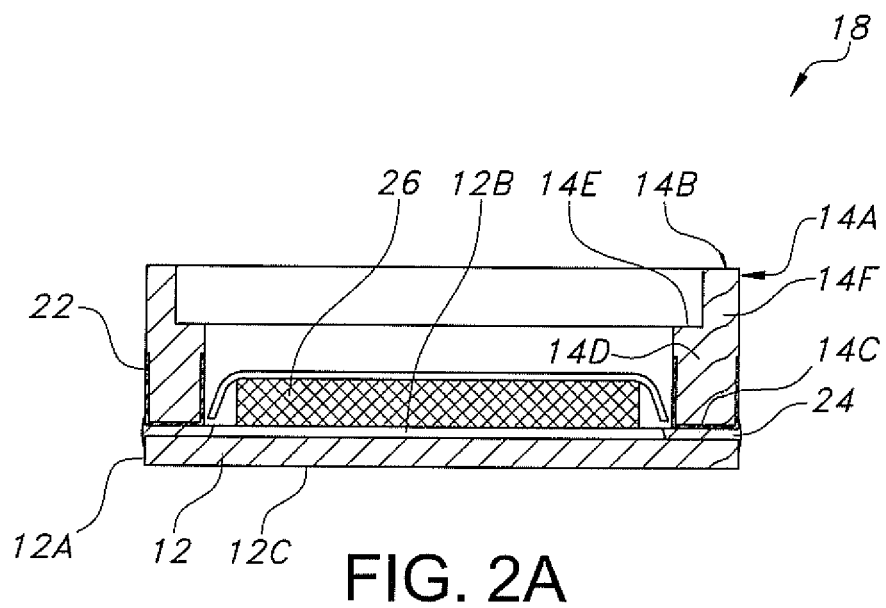
FIGS. 2A and 2B illustrate that the electrochemical cell 10 shown in FIGS. 1 and 2 is assembled from a casing first or lower subassembly 18 (FIG. 2A) and a casing second or upper subassembly 20 (FIG. 2B).
Figure 2B:
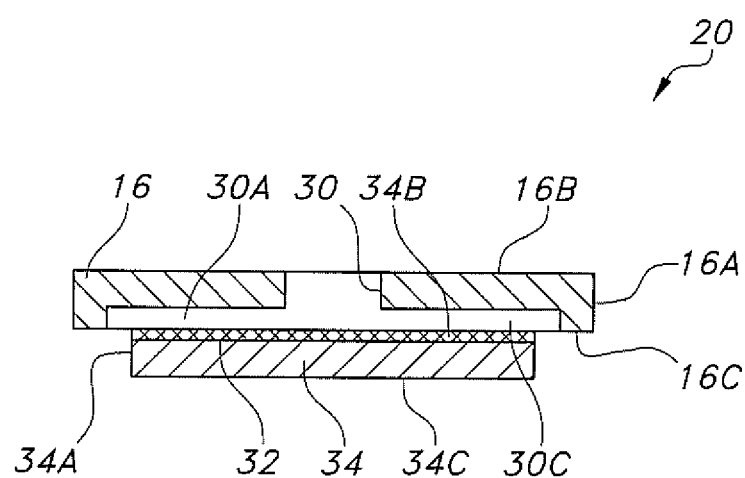
Figure 3:
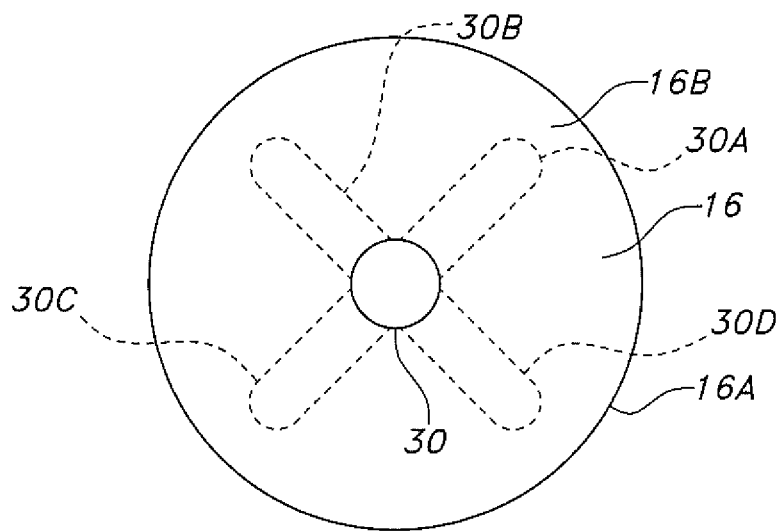
FIG. 3 is a plan view of the cover plate or lid 16 for the casing of the electrochemical cell 10 showing the electrolyte fill port 30 in communication with four inner electrolyte channels 30A, 30B, 30C and 30D in the casing lid 16.
Figure 4:
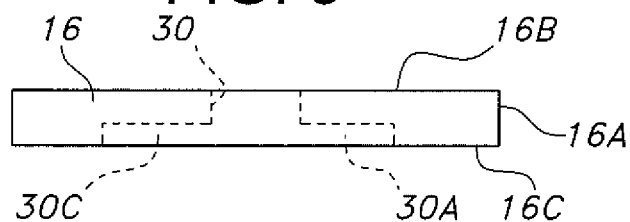
FIG. 4 is a side elevational view of the casing lid 16 shown in FIG. 3 with the electrolyte fill port 30 and inner electrolyte channels 30A, 30B, 30C and 30D in phantom.
Figure 5:
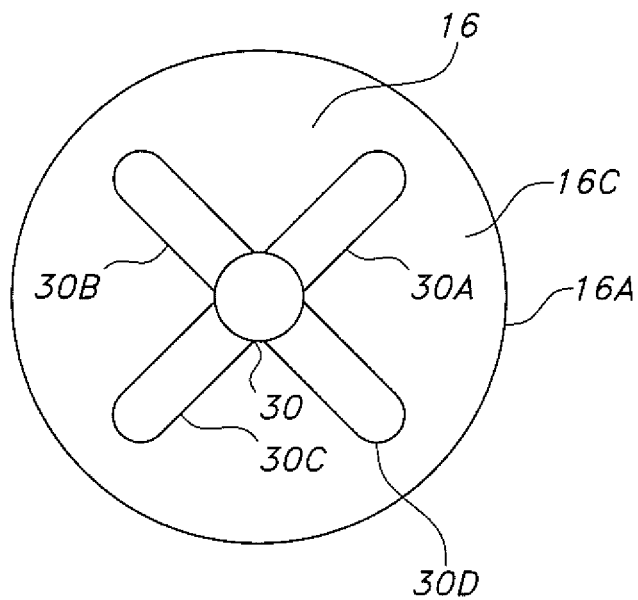
FIG. 5 is a bottom plan view of the casing lid 16 shown in FIGS. 3 and 4.

FIGS. 2A and 2B illustrate that the casing for the cell 10 is assembled from a casing first or lower subassembly 18 (FIG. 2A) and a casing second or upper subassembly 20 (FIG. 2B). The casing first subassembly 18 comprises the lower plate 12 having an annular peripheral edge 12A extending to and meeting a lower plate upper surface 12B spaced from a lower plate lower surface 12C.

FIG. 2A further shows that the annular sidewall 14 comprises a cylindrically-shaped outer surface 14A extending to an upper annular edge 14B spaced from a lower annular edge 14C. The upper and lower annular edges 14B, 14C reside along respective imaginary planes that are substantially parallel to each other. An inner surface of the annular sidewall 14 has a first or lower cylindrically-shaped portion 14D extending upwardly part-way along the height of the sidewall 14 from the lower annular edge 14C to a step 14E. A second or upper cylindrically-shaped portion 14F extends upwardly from the step 14E to the upper annular edge 14B.

An annular layer of dielectric material 22, for example, an alumina ($Al_2O_3$) material, is coated on the lower edge 14C and the inner surface of the lower cylindrically-shaped portion 14D of the annular sidewall 14. For ease in manufacturing, the dielectric layer 22 may also be coated on the outer surface 14A. While the dielectric material 22 is shown in FIGS. 2 and 2A extending along the lower cylindrically-shaped portion 14D of the annular sidewall 14 to the step 14E, to function properly it need only extend along the inner portion 14D to a height that is greater than the thickness of the active material (either cathode or anode) that will subsequently nest in the casing lower subassembly 18.

FIGS. 2 and 2A further show that the lower plate 12 has a diameter at its annular peripheral edge 12A that is substantially similar to the outer diameter of the annular sidewall 14. To secure the lower plate 12 to the annular sidewall 14, an endless ring of sealing glass 24 is contacted or positioned on the upper planar surface 12B of the lower plate 12. The sealing glass 24 has a width that is substantially the same as and aligned with the lower edge 14C of the annular sidewall 14.

Depositing the sealing glass 24 is achieved by several suitable methods including screen printing, dispensing, dipping into a frit paste or the use of a preformed endless glass ring. Suitable sealing glasses include both vitreous and crystallizing compositions that exhibit good electrical isolation properties and form mechanical bonds with good wetting characteristics to the metals of the lower plate 12 and the annular sidewall 14. Exemplary sealing glasses include, but axe not limited to, Ferro IP510, Corning 1890, Schott 8422 and Schott 8629.

The lower plate 12, sealing glass 24 and annular sidewall 14 comprising the casing first subassembly 18 are then heated to a temperature that is sufficient to burn off any organic binders that may be present in the glass 24 and to flow the glass to achieve a glass-to-metal seal between the lower plate 12 and the annular sidewall 14. The sealing glass 24 has a thickness that ranges from about 0.002 inches to about 0.0025 inches, which is sufficient to ensure electrical isolation between the lower plate 12 and the annular sidewall 14.

After the lower plate 12 and the annular sidewall 14 are secured together by the intermediate sealing glass 24, a first electrode active material 26, for example, an anode active material, is supported on the upper surface 12B of the lower plate. The anode active material 26 preferably extends to the dielectric coating 22 on the inner surface of the lower cylindrically-shaped portion 14D of the annular sidewall 14. The anode active material 26 is deposited on the lower plate 12 using any one of many suitable techniques including being pressed into contact with the plate, preformed into a sheet that is pressed into contact with the plate, sprayed onto the plate, sputtered onto the plate, or coated on the plate. While not intending to limit the present electrochemical cell 10, the anode active material 26 has a thickness that ranges from about 5 μm to about 1 mm. In other embodiments, the anode active material 26 has a thickness that is greater than 1 mm.

Illustrative anode active materials include carbon-based materials selected from coke, graphite, acetylene black, carbon black, glass carbon, hairy carbon, and mixtures thereof, or lithiated materials selected from $Li_4Ti_5O_{12}$, lithiated silver vanadium oxide, lithiated copper silver vanadium oxide, lithiated copper sulfide, lithiated iron sulfide, lithiated iron disulfide, lithiated titanium disulfide, lithiated copper vanadium oxide, $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$, and mixtures thereof. Lithium is also a suitable anode active material.

A separator 28 (FIGS. 2 and 2A) is placed on top of the anode active material 26. The separator 28 preferably extends to the dielectric coating 22 on the inner surface of the lower cylindrically-shaped portion 14D of the annular sidewall 14. The separator 28 has a thickness that ranges from about 5 μm to about 30 μm.

Illustrative separator materials include non-woven glass, polypropylene, polyethylene, microporous materials, glass fiber materials, ceramics, the polytetrafluorethylene membrane commercially available under the designations ZITEX (Chemplast Inc.), the polypropylene membrane commercially available under the designation CELGARD (Celanese Plastic Company Inc.) and DEXIGLAS (C. H. Dexter, Div., Dexter Corp.). Other separator materials that are useful with the present invention includes woven fabrics comprising halogenated polymeric fibers, as described in U.S. Pat. No.

5,415,959 to Pyszczek et al., which is assigned to the assignee of the present invention and incorporated herein by reference. Examples of halogenated polymeric materials that are suitable for the present invention include, but are not limited to, polyethylene tetrafluoroethylene which is commercially available under the name Tefzel, a trademark of the DuPont Company, polyethylenechlorotrifluoroethylene which is commercially available under the name Halar, a trademark of the Allied Chemical Company, and polyvinylidene fluoride.

FIG. 2B illustrates that the casing second subassembly 20 comprises the upper plate-shaped lid 16 having an annular peripheral edge 16A extending to and meeting a lid upper surface 16B spaced from a lid lower surface 16C. An electrolyte fill opening or port 30 extends through the thickness of the lid 16, to the upper and lower surfaces 16B, 16C thereof. While the fill port 30 is shown substantially centered in the lid 16, that is not necessary. To serve as a fill opening, the fill port 30 need only provide an open path from the upper surface 16B to the lower surface 16C of the lid 16.

Separately, a current collector 32 is contacted to the lower surface 16C of the lid 16. The cathode current collector 32 has a thickness that ranges from about 0.1 µm to about 50 µm, and is deposited on the lower surface 16C of the lid 16 by any one of many suitable processes including by a physical vapor deposition (PVD) process, for example, sputter deposition or evaporation deposition. Cathode current collector 32 can also be physically attached to the lid 16 by a weld. Exemplary current collector materials include nickel, titanium, copper, and Ti/NiV composites.

As shown in FIGS. 2B and 3 to 5, the lid lower surface 16C is provided with at least one, and preferably, at least two or more, for example, four electrolyte channels 30A, 30B, 30C and 30D. The electrolyte channels 30A, 30B, 30C and 30D, which are shown aligned at 90° with respect to each other, extend radially from the electrolyte fill port 30 outwardly beyond the outer peripheral edge of the current collector 32, but not to the annular edge 16A of the lid. The electrolyte channels 30A, 30B, 30C and 30D have a depth that is from about 5% to about 50% of the thickness of the lid 16 as measured from the lid upper and lower surfaces 16B and 16C. If desired, there can be more than four electrolyte channels and the channels can be at other than 90° with respect to each other. The purpose of the electrolyte fill system comprising the channels 30A, 30B, 30C and 30D in fluid flow communication with the electrolyte fill port 30 will be described in detail hereinafter.

A second electrode active material, for example, a cathode active material 34 is contacted to the current collector 32 opposite the lid 16. The cathode active material 34 has an outer annular edge 34A extending to an active material upper face 34B spaced from an active material lower face 34C. That way, the exemplary cathode active material 34 is in electrical continuity with the cathode current collector 32 and the lid 16.

The cathode active material 34 is deposited using any one of many suitable methods (i.e. dispensed, pressed, preformed, sprayed, sputter deposition, evaporation deposition, tape casted, and as a coating). While not intending to limit the present electrochemical cell 10, the cathode active material 34 has a thickness extending to its upper and lower faces 34B and 34C that ranges from about 5 µm to about 1 mm. In other embodiments, the cathode active material 34 has a thickness that is greater than 1 mm. Suitable cathode active materials 34 are selected from lithium nickel manganese cobalt oxide ($LiNi_aMn_bCo_{1-a-b}O_2$) $LiCoO_2$, $LiNiO_2$, $LiMnO_2$, TiS, FeS, $FeS_2$, $CF_x$, $Ag_2O$, $Ag_2O_2$, $Ag_2CrO_4$, silver vanadium oxide (SVO), copper silver vanadium oxide (CSVO), $V_2O_5$, $MnO_2$.

If desired, the cathode active material 34 is mixed with a binder material and a solvent prior to being deposited on the current collector 32. Binders such as, but not limited to, a powdered fluoro-polymer, more preferably powdered polytetrafluoroethylene or powdered polyvinylidene fluoride and solvents, such as but not limited to, trimethylphosphate (TMP), dimethylformamide (DMF), dimethylacetamide (DMAc), tetramethylurea (TMU), dimethylsulfoxide (DMSO), or n-methyl-2-pyrrolidone (NMP) may be used.

In addition, up to about 10 weight percent of a conductive diluent may be added to the cathode active material 34 to improve conductivity. Suitable materials for this purpose include acetylene black, carbon black, and graphite or, a metallic powder such as powdered nickel, aluminum, titanium, and stainless steel.

In an exemplary embodiment, the cathode active material has a diameter of about 0.068 inches, or about 0.005 inches less than the inside diameter of the annular sidewall 14. In an exemplary embodiment, the cathode active material has a diameter of about 0.068 inches. In another exemplary embodiment, the cathode active material has a diameter that is about 0.005 inches less than the inside diameter of the annular sidewall 14.

It is often the case that a current collector having an active material contacted to both of its opposed major surfaces has a plurality of openings. These openings provide the current collector with a structure like that of a screen. The openings help the opposed sheets or layers of active material lock to each other through the openings. However, in the present electrochemical cell 10, since the active material 34 only contacts the current collector 32 on one side (the side opposite the lid 16), a current collector screen is not needed. In fact, having the current collector 32 as a continuous sheet of electrically conductive material saves processing costs generally associated with providing the plurality of perforations.

The lid 16 has a diameter that is sized to fit into the second or upper cylindrically-shaped portion 14F of the annular sidewall 14, supported on the step 14E. In this seated position, the upper planar surface 16B of the lid 16 is substantially co-planar with the upper annular edge 14B of the sidewall 14. As shown in FIGS. 1 and 2, the lid 16 is hermetically secured or sealed to the sidewall 14 with an annular weld 36.

An activating electrolyte (not shown) is then filled into the casing through the fill port 30. The fill port 30 is preferably closed with a closure plug (not shown) that has been press-fit into the opening followed by being welded to the lid 16. Alternately, the fill port 30 is closed by directing a laser beam at the lid 16 to cause material of the plate to flow into and hermetically seal the port 30. Suitable closure systems for sealing an electrolyte fill port are described in U.S. Pat. No. 6,610,443 to Paulot et al., U.S. Pat. No. 7,128,765 to Paulot et al. and U.S. Pat. No. 10,446,825 to Voss et al. These patents are assigned to the assignee of the present invention and incorporated herein by reference.

The activating electrolyte is a nonaqueous and ionically conductive material mixture serving as a medium for migration of ions between the anode and cathode active materials during conversion of ions in atomic or molecular forms which migrate from the anode active material 26 to the cathode active material 34. Nonaqueous electrolytes that are suitable for the present electrochemical cell 10 are substantially inert to the anode and cathode active materials, and they exhibit those physical properties necessary for ionic transport, namely, low viscosity, low surface tension and wettability.

A suitable electrolyte has an inorganic, ionically conductive lithium salt dissolved in a mixture of aprotic organic solvents comprising a low viscosity solvent and a high permittivity solvent. The inorganic, ionically conductive lithium salt serves as the vehicle for migration of the anode ions to intercalate or react with the cathode active material 34. Suitable lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

Low viscosity solvents useful with the present electrochemical cell 10 include ester's, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

In the present electrochemical cell 10, the preferred anode active material 26 is lithium metal and the preferred electrolyte is 0.8M to 1.5M $LiAsF_6$ or $LiPF_6$ dissolved in a 30:70 mixture, by volume, of propylene carbonate as the preferred high permittivity solvent and 1,2-dimethoxyethane as the preferred low viscosity solvent.

The fill port 30 in fluid flow communication with the at least one and preferably four electrolyte channels 30A, 30B, 30C and 30D extending part-way into the thickness of the lid 16 from the lower surface 16C thereof provides a system that allows the casing to be filled with electrolyte using a vacuum filling process. Without the fill port 30 and electrolyte channels 30A, 30B, 30C and 30D, the electrode assembly would need to be soaked in electrolyte and the remaining casing void volume filled with additional electrolyte prior to welding the lid 16 to the annular sidewall 14. This creates multiple problems. First, internal voids within the opposite polarity electrode active materials are not optimally filled with electrolyte without a vacuum drawing electrolyte into all available porosity. A second issue relates to the difficulty in welding the lid 16 to the annular sidewall 14 in the presence of electrolyte. Heat generated by the welding process can cause electrolyte to evaporate and form outgassing byproducts that can contaminate the weld 36, thereby reducing weld integrity.

When the present electrochemical cell 10 is of a primary chemistry, the combined thicknesses of the anode active material 26, separator 28, the cathode active material 34 and the cathode current collector 32 is substantially equal to or slightly greater than the combined height of the sealing glass 24 and the lower inner cylindrically-shaped portion 14D of the annular sidewall 14 as measured from the lower plate 12 to the step 14E. That way, there is sufficient stack pressure inside the casing to provide intimate contact between the anode/cathode electrode assembly to thereby ensure acceptable discharge for the primary chemistry cell.

Alternatively, when the electrochemical cell 10 is of a secondary chemistry, the combined thicknesses of the anode active material 26, the separator 28, the cathode active material 34 and the cathode current collector 32 is somewhat less than the combined height of the sealing glass 24 and the lower inner cylindrically-shaped portion 14D of the annular sidewall 14 as measured from the lower plate 12 to the step 14E. That way, there is sufficient free space inside the casing to accommodate expansion and contraction of the electrode stack or anode/cathode electrode assembly as the electrochemical cell 10 of the secondary chemistry is subjected to charge and discharge cycles.

With the electrochemical cell 10 comprising the electrode assembly of the anode active material 26/cathode active material 34 activated with the electrolyte and housed inside the casing comprising the casing lower subassembly 18 (FIG. 2A) hermetically sealed to the casing upper subassembly 20 (FIG. 2B), the lid 16 welded to the annular sidewall 14 in contact with the cathode current collector 32 and the cathode active material 34 serves as the positive terminal, and the lower plate 12 in contact with the anode active material 26 serves as the negative terminal for the cell.

As those skilled in the art will readily appreciate, the cathode active material 34 can be switched with the anode active material 26. In this alternate embodiment, the cathode active material 34 in contact with cathode current collector 32 contacting the lower plate 12 serves as the positive terminal and the anode active material 26 in contact with the lid 16 welded to the annular sidewall 14 serves as the negative terminal.

With the lower plate 12 having a surface area ranging from about 1 $mm^2$ to about 1 $cm^2$ (surface area of either of the upper and lower surfaces 12B, 12C), the upper surface 16B of the lid 16 and the upper edge 14B of the annular sidewall 14 having a combined surface area ranging from about 1 $mm^2$ to about 1 $cm^2$, and with the height of the casing as measured from the lower surface 12C of the lower plate 12 to the upper edge 14B of the annular sidewall 14 ranging from about 250 μm to about 2.5 mm, the present electrochemical cell 10 represents an advancement in electrochemical technology. The cell can be built with a total volume that is less than 0.5 cc but, as a hermetically sealed enclosure, is capable of being implanted in human or animal body tissue for extended periods of time.

Thus, the purpose of the fill port 30 in fluid flow communication with the at least one and preferably four electrolyte channels 30A, 30B, 30C and 30D is to provide an open pathway for electrolyte to flow downwardly past the current collector 32 to wet the cathode active material 34, the separator 28 and the anode active material 26. This is especially important in the miniature electrochemical cells of the present invention having a size or total volume that is less than 0.5 cc. In such small size cells, the desired volume of electrolyte is sufficient to activate the anode and cathode active materials 26, 34 without there being an overabundance of electrolyte. Without the electrolyte fill system comprising the electrolyte channels 30A, 30B, 30C and 30D extending radially from the fill port 30, outwardly beyond the outer peripheral edge of the current collector 32, it is sometimes difficult for the electrolyte to sufficiently wet the electrode assembly 26, 34 to promote acceptable cell discharge.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
   a) a casing, comprising:
      i) a metallic annular sidewall extending to an upper annular edge defining an upper open end spaced from a lower annular edge defining a lower open end, the metallic annular sidewall having an inner surface;
      ii) a metallic lid closing the upper open end of the annuylar sideawall, wherein the metallic lid extends from a lid outer surface to a lid inner surface;
      iii) a current collector having an outer peripheral edge extending to a current spaced collector first side spaced from a current collector second side, wherein the current collector first side contacts the inner surface of the metallic lid;
      iv) a metallic lower plate;
      v) a dielectric material coating the lower annular edge and at least a portion of the inner surface of the metallic annular sidewall;
      vi) a ring-shaped sealing glass hermetically contacted to the metallic lower plate and hermetically contacted to the dielectric material coating the lower annular edge of the metallic annular sidewall; and
      vii) a hermetically sealed electrolyte fill port extending to the lid outer and inner surfaces; and
   b) an electrode assembly housed inside the casing, the electrode assembly comprising:
      i) an anode active material comprising an anode outer annular edge extending to an anode active material upperface spaced from an anode active material lower face;
      ii) a cathode active material comprising a cathode outer annular edge extending to a cathode active material upper face spaced from a cathode active material lower face; and
      iii) a separator segregating the anode active material from directed physical contact with the cathode active material; and
   c) an activating electrolyte contacting the electrode assembly,
   d) wherein the electrolyte fill port is spaced above and axially aligned with the first side of the current collector contacting the inner surface of the metallic lid with the curreent collector second side contacting one of the anode active material upper face and the cathode active material upper face so that the metallic lid serves as one terminal for the cell, and
   e) wherein the electrolyte fill port and the one of the anode and cathode active materials contacting the current collector are axially aligned with the other of the anode active material lower face and the cathode active material lower face contacting the metallic lower plate serving as the other terminal for the cell, and
   f) wherein at least one electrolyte channel in the inner surface of the lid extends from the electrolyte fill port and radially outwardly beyond the outer peripheral edge of the current collector, outwardly beyond the outer annuylar edge of the one of the anode and cathode active materials contacting the current collector second side, and outwardly beyond the outer annular edge of the other of the anode and cathode active materials contacting the inner surface of the metallic lower plate.

2. The electrochemical cell of claim 1, wherein the dielectric material is an alumina ($Al_2O_3$).

3. The electrochemical cell of claim 1, wherein the sealing glass is a vitreous and crystallizing composition.

4. The electrochemical cell of claim 1, wherein an outer peripheral edge of the metallic lower plate has a diameter that is substantially the same as that of an outer surface of the metallic annular sidewall.

5. The electrochemical cell of claim 1, wherein an outer surface of the metallic annular sidewall is cylindrical.

6. The electrochemical cell of claim 1, wherein an upper step is provided in the inner surface of the metallic annular sidewall adjacent to the upper open end, and wherein the metallic lid is seated on the upper step.

7. The electrochemical cell of claim 1, wherein the lid outer surface is substantially co-planar with the upper annular edge of the metallic annular sidewall.

8. The electrochemical cell of claim 1, wherein the metallic lid is welded to the metallic annular sidewall to thereby close the upper open end thereof.

9. The electrochemical cell of claim 1, wherein the electrolyte fill port is either welded closed or provided with a closure plug that is welded to the metallic lid to hermetically seal the electrolyte fill port.

10. The electrochemical cell of claim 1, wherein the anode active material is selected from coke, graphite, acetylene black, carbon black, glass carbon, hairy carbon, $Li_4Ti_5O_{12}$, lithiated silver vanadium oxide, lithiated copper silver vanadium oxide, lithiated copper sulfide, lithiated iron sulfide, lithiated iron disulfide, lithiated titanium disulfide, lithiated copper vanadium oxide, $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$, lithium, and mixtures thereon, and wherein the cathode active material is selected from the group of lithium nickel manganese cobalt oxide ($LiNi_aMn_bCo_{1-a-b}O_2$), $LiCoO_2$, $LiNiO_2$, $LiMnO_2$, TiS, FeS, $FeS_2$, $CF_x$, $Ag_2O$, $Ag_2O_2$, $Ag_2CrO_4$, silver vanadium oxide (SVO), copper silver vanadium oxide (CSVO), $V_2O_5$, $MnO_2$.

11. The electrochemical cell of claim 1 having a total volume that is less than 0.5 cc.

12. The electrochemical cell of claim 1, wherein there are from one to four electrolyte channels in the inner surface of the metallic lid that extend radially outwardly from the electrolyte fill port and beyond the outer peripheral edge of the current collector, and wherein the one to four electrolyte channels each have a depth that is from about 5% to about 50% of the thickness of the lid as measured from the lid outer surface to the lid inner surface.

13. The electrochemical cell of claim 1, wherein the metallic lid, metallic annular sidewall and the metallic lower plate are individually seleted from one of titanium, stainless steel, mild steel, nickel-plated mild steel.

14. An electrochemical cell, comprising:
   a) a casing, comprising:
      i) an metallic annular sidewall extending to an upper annular edge defining an upper open end spaced from a lower annular edge defining a lower open end, the metallic annular sidewall having an inner surface, wherein an upper step is provided in the inner surface of the metallic annular sidewall adjacent to the upper open end;
      ii) a metallic lid seated on the upper step to close the upper open end of the metallic annular sidewall, wherein the metallic lid extends from a lid outer surface to a lid inner surface;
      iii) a current collector having an outer peripheral edge extending to a current collector first side spaced from a current collector second side, wherein the current collector first side contacts the inner surface of the metallic lid;
      iv) a metallic lower plate;

v) an alumina ($Al_2O_3$) coating the lower annular edge and at least a portion of an inner surface of the metallic annular sidewall;

vi) a ring-shaped sealing glass hermetically contacted to the metallic lower plate and hermetically contacted to the alumina at the lower annular edge of the metallic annular sidewall; and vii) a hermetically sealed electrolyte fill port extending to the lid outer and inner surfaces; and b) an electrode assembly housed inside the casing, the electrode assembly comprising:

i) an anode active material comprising an anode outer annular edge extending to an anode active material upper face spaced from an anode active material lower face;

ii) a cathode active material comprising a cathode outer annular edge extending to a cathode active material upper face spaced from a cathode active material lower face; and iii) a separator segregating the anode active material from directed physical contact with the cathode active material; and c) an activating electrolyte contacting the electrode assembly, d) wherein the electrolyte fill port is spaced above and axially aligned with the first side of the current collector contacting the inner surface of the metallic lid with the current collector second side contacting one of the anode active material upper face and the cathode active material upper face so that the metallic lid serves as one terminal for the cell, e) wherein the electrolyte fill port and the one of the anode and cathode active materials contacting the current collector are axially aligned with the other of the anode active material lower face and the cathode active material lower face contacting the metallic lower plate serving as the other terminal for the cell, and f) wherein at least one electrolyte channel in the inner surface of the lid extends from the electrolyte fill port and radially outwardly beyond the outer peripheral edge of the current collector, outwardly beyond the outer annular edge of the one of the anode and cathode active materials contacting the current collector second side, and outwardly beyond the outer annular edge of the other of the anode and cathode active materials contacting the inner surface of the metallic lower plate.

15. The electrochemical cell of claim 14, wherein there are four electrolyte channels in the inner surface of the metallic lid extending radially outwardly from the electrolyte fill port and beyond then outer peripheral edge of the current collector, and wherein the four electrolyte channels each have a depth that is from about 5% to about 50% of the thickness of the lid as measured from the lid outer surface to the lid inner surface.

16. The electrochemical cell of claim 14, wherein the metallic lid; metallic annular sidewall and the metallic lower plate are individually selected from one of titanium, stainless steel, mild steel, nickel-plated milde steel.

17. The electrochemical cell of claim 14, wherein the metallic lid is welded to the metallic annular sidewall to thereby close the upper open end thereof.

18. The electrochemical cell of claim 14, wherein the sealing glass is a vitreous and crystallizing composition.

19. The electrochemical cell of claim 14, wherein an outer surface of the metallic annular sidewall is cylindrical, and wherein an outer peripheral edge of the metallic lower plate has a diameter that is substantially the same as that of the outer surface of the metallic annular sidewall, and wherein the lid outer surface is substantically co-planar with the upper annular edge of the metallic annular sidewall.

20. The electrochemical cell of claim 14, wherein the anode active material is selected from coke, graphite, acetylene black, carbon black, glass carbon, hairy carbon, $Li_4Ti_5O_{12}$, lithiated silver vanadium oxide, lithiated copper silver vanadium oxide, lithiated copper sulfide, lithiated iron silfide, lithiated iron disulfide, lithiated titanium disulfide, lithiated copper vanadium oxide, $Li_xCu_wAg_yV_2O_z$ with $0.5 \leq x \leq 4.0$, $0.01 \leq w \leq 1.0$, $0.01 \leq y \leq 1.0$ and $5.01 \leq z$ v $6.5$, lithium, and mixtures thereon, and wherein the cathode active material is selected from lithium nickelmanganese cobalt oxide ($LiNi_aMn_bCo_{1-a-b}O_2$), $LiCoO_2$, $LiNiO_2$, $LiMnO_2$, $TiS$, $FeS$, $FeS_2$, $CF_x$, $Ag_2O$, $Ag_2O_2$, $Ag_2CrO_4$, silver vanadium oxide (SVO), copper silver vanadium oxide (CSVO), $V_2O_5$, $MnO_2$.

21. An electrochemical cell, comprising:

a) a casing, comprising:

i) a metallic annular sidewall extending to an upper annular edge defining an upper open end spaced from a lower annular edge defining a lower open end, the metallic annular sidewall having an inner surface;

ii) a metallic lid closing the upper open end of the annular sidewall, wherein the metallic lid extends from a lid outer surface to a lid inner surface;

iii) a current collector having an outer peripheral edge extending to a current collector first side spaced from a current collector second side, wherein the current collector first side contacts the inner surface of the metallic lid;

iv) a metallic lower plate;

v) a dielectric material coating the lower annular edge and at least a portion of the inner surface of the metallic annular sidewall;

vi) a ring-shaped sealing glass hermetically contacted to the metallic lower plate and hermetically contacted to the dielectric material coating the lower annular edge of the metallic annular sidewall; and vii) a hermetically sealed electrolyte fill port extending to the lid outer and inner surfaces; and b) an electrode assembly housed inside the casing, the electrode assembly comprising:

i) an anode active material comprising an anode outer annular edge extending to an anode active material upper face spaced from an anode active material lower face;

ii) a cathode active material comprising a cathode outer annular edge extending to a cathode active material upper face spaced from a cathode active material lower face; and iii) a separator segregating the anode active material from directed physical contact with the cathode active material; and c) an activating electrolyte containing the electrode assembly, d) wherein the electrolyte fill port is spaced above and axially aligned with the first side of the current collector contacting the inner surface of the metallic lid with the current collector seond side contacting one of the anode active material upper face and the cathode active material upper face so that the metallic lid serves as one terminal for the cell, and e) wherein the electrolyte fill port and the one of the anode and cathode active materials contacting the current collector are axially aligned with the other of the anode active material lower face and the cathode active material lower face contacting the metallic lower plate serving as the other terminal for the cell, and f) wherein at least one electrolyte channel in the inner surface of the lid extends from the electrolyte fill port and radially outwardly beyond the outer peripheral edge of the current collector and outwardly beyond the outer annular edge of the one of the anode and cathode active materials contacting the current collector second side.

* * * * *